United States Patent [19]
Reid et al.

[11] Patent Number: 5,414,317
[45] Date of Patent: May 9, 1995

[54] ELECTRIC MOTOR WITH BRUSH CARD ISOLATED FROM ENDFRAME

[75] Inventors: Dennis G. Reid, Lansing; Michael T. Clarke, Lake Odessa, both of Mich.

[73] Assignee: Eaton Stamping Company, Eaton Rapids, Mich.

[21] Appl. No.: 145,497

[22] Filed: Oct. 29, 1993

[51] Int. Cl.6 ................... H02K 05/14; H02K 05/24; H02K 13/00
[52] U.S. Cl. ....................... 310/239; 310/43; 310/51; 310/91
[58] Field of Search ............ 310/42, 43, 51, 89, 310/91, 235, 239, 242, 238, 71

[56]  References Cited

U.S. PATENT DOCUMENTS

| | | | |
|---|---|---|---|
| 3,760,209 | 9/1973 | Hult | 310/91 |
| 3,824,416 | 7/1974 | van de Griend | 310/51 |
| 4,209,723 | 6/1980 | Hamman | 310/112 |
| 4,303,901 | 12/1981 | Grimm et al. | 335/272 |
| 4,340,831 | 7/1982 | Kuhlmann et al. | 310/239 |
| 4,585,968 | 4/1986 | Cambrodon | 310/239 |
| 4,602,176 | 7/1986 | Baker | 310/51 |
| 4,922,149 | 5/1990 | Isozumi et al. | 310/89 |
| 5,026,476 | 6/1991 | Ishimoto et al. | 310/89 |
| 5,113,106 | 5/1992 | Schmid | 310/239 |

*Primary Examiner*—Steven L. Stephan
*Assistant Examiner*—D. R. Haszko
*Attorney, Agent, or Firm*—Lorusso & Loud

[57] ABSTRACT

There is presented an electric motor having a drive shaft, an armature and commutator fixed on the drive shaft, a metal housing disposed around the armature, permanent magnets disposed between the armature and the housing, and an endframe fixed to the housing. A discrete brush card is fixed to the housing and has a central cylindrical portion for retaining the commutator, and brush tubes extending radially from the central portion. The brush tubes are adapted to retain brushes and brush springs for urging the brushes into engagement with the commutator. The brush card is provided with tab portions having orifices therethrough and elastomeric grommets mounted thereon, the grommets having openings extending therethrough and aligned with the tab orifices. The endframe is provided with posts extending from an end wall thereof. The grommet openings are configured to receive, respectively, the posts to lock the grommets onto the posts. The grommets are at least in part disposed between the brush card and the endframe end wall to isolate the brush card from the endframe end wall.

12 Claims, 6 Drawing Sheets

ELECTRIC MOTOR WITH BRUSH CARD ISOLATED FROM ENDFRAME

BACKGROUND OF THE INVENTION

1. Field of the Invention

The invention relates to electric motors and is directed more particularly to an electric motor having a discrete plastic brush card mounted in an endframe but isolated from the endframe.

2. Description of the Prior Art

In electric motors, brushes are commonly retained in brush tubes which usually are molded integrally with the endframe of the motor. The endframe and brush tubes typically are of a plastic material. The brush tubes are square in cross-section and hollow, somewhat like elevator shafts, in which spring-biased brushes are slidably moveable into engagement with the commutator of the motor.

Noise usually is generated at the commutator-brush interface, the surface of the rotating commutators being continuously engaged by the relatively stationary brushes. The noise is exacerbated by the hollow elongated brush tubes, acting as echo-chambers, which, being integral with the endframe, transmit the noise to the endframe, which is exposed.

In some applications, the noise generated at the commutator-brush interface is unacceptable. For example, in D.C. motors used in automobiles for operation of power seats, it is most desirable that the motors operate silently.

Accordingly, there exists a need for a motor having a quieter arrangement of endframe and brush tubes.

SUMMARY OF THE INVENTION

It is, therefore, an object of the invention to provide an electric motor having an endframe and brush tube arrangement given to relatively silent running.

A further object of the invention is to provide an electric motor having a discrete brush card which includes brush tubes, the brush card being mounted in the endframe but isolated from the endframe so as not to transmit noise thereto.

With the above and other objects in view, as will hereinafter appear, a feature of the present invention is the provision of an electric motor comprising a drive shaft, an armature and commutator assembly fixed on the drive shaft, a metal housing disposed around an armature portion of the armature and commutator assembly, permanent magnet means disposed between the armature portion and the housing, and an endframe fixed to the housing. The motor further includes a discrete brush card mounted in the endframe. The brush card is provided with a cylindrical portion for retaining a commutator portion of the armature and commutator assembly, and brush tubes extending radially outwardly from the cylindrical portion. Each of the brush tubes is adapted to retain a brush for engaging the commutator portion, and a brush spring for urging the brush into engagement with the commutator. The brush card is provided with tab portions having orifices therethrough. Elastomeric grommets are mounted on the tab portions and have openings therethrough and aligned with the tab orifices. The endframe is provided with posts extending from an end wall of the endframe. The grommet openings are configured to receive the posts to lock the grommets onto the posts. The grommets are disposed at least in part between the brush card and the endframe end wall to isolate the brush card from the endframe end wall.

In accordance with a further feature of the invention, there is provided a brush card for connection to an endframe of an electric motor, the card comprising a cylindrically-shaped central portion for retaining a commutator portion of the motor, brush tubes extending radially outwardly from the central portion, the brush tubes being configured each to retain a brush, and a brush spring for urging the brush into engagement with the commutator portion. The brush card is provided with tab portions with orifices therethrough, and grommets are mounted on the tab portions, the grommets having openings therethrough aligned, respectively, with the tab orifices. At least a portion of each of the grommets is disposed on a surface of the tab portion adapted to be adjacent a wall of the endframe, whereby to separate the brush card from the endframe wall upon the connection of the brush card to the endframe.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
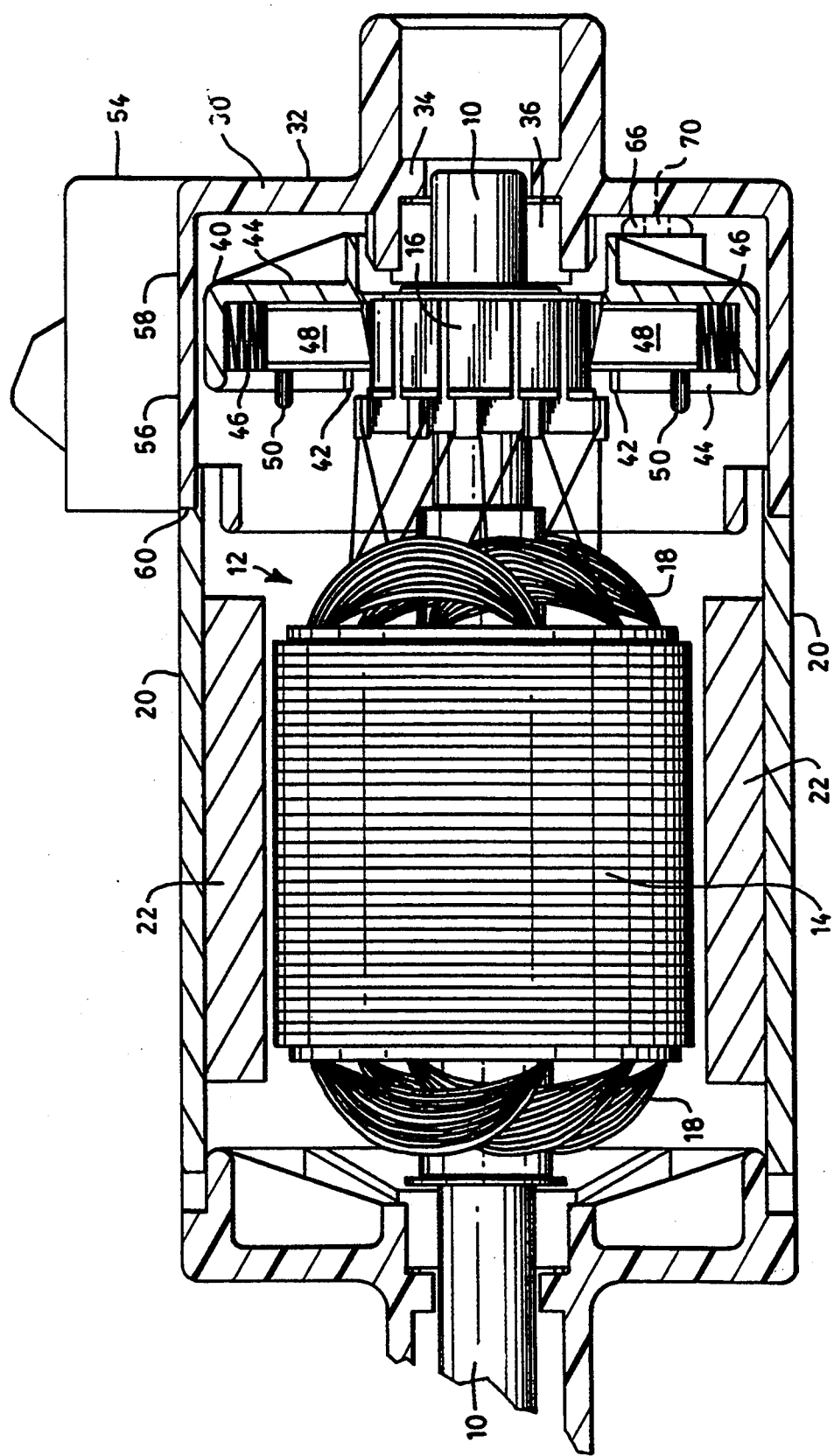
FIG. 1 is a partly side elevational, partly sectional, view of one form of motor illustrative of an embodiment of the invention.

Referring to FIG. 1, it will be seen that the illustrative motor includes a drive shaft 10. Fixed to the drive shaft 10 is an armature and commutator assembly 12, including an armature 14, a commutator 16, and appropriate windings 18.

A metal housing shell 20, preferably of steel, is disposed around the armature 14. Permanent magnets 22 are disposed between the housing shell 20 and the armature 14 and are secured to the housing shell.

An endframe 30 of noise-absorbing plastic material, is fixed to the housing shell 20. The endframe 30 has formed in a substantially closed end 32 a journal 34 for retaining a bearing 36 which, in turn, supports the drive shaft 10.

Figure 2:
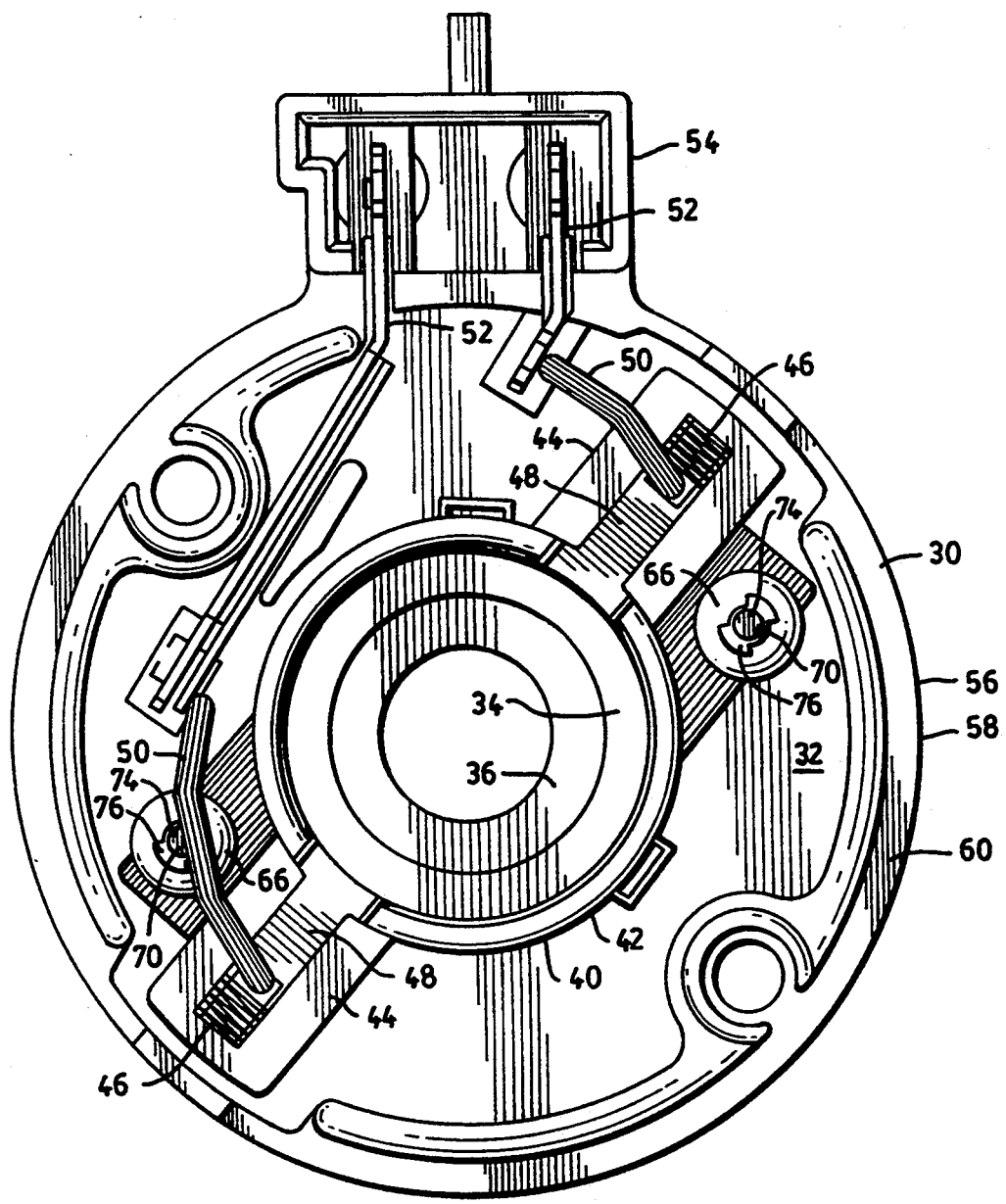
FIG. 2 is an end view of an endframe portion of the motor shown in FIG. 1, taken from the open end of the endframe.
Figure 4:
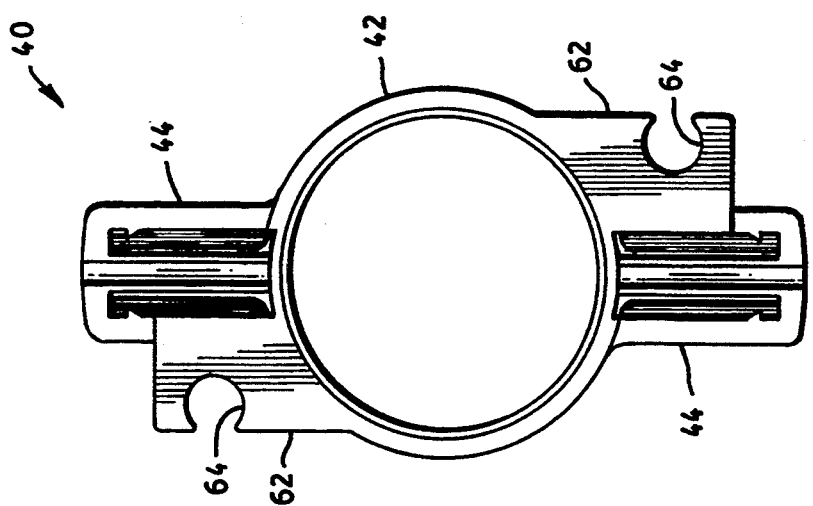
FIG. 4 is a rear elevational view of the brush card of FIG. 3.
Figure 3:
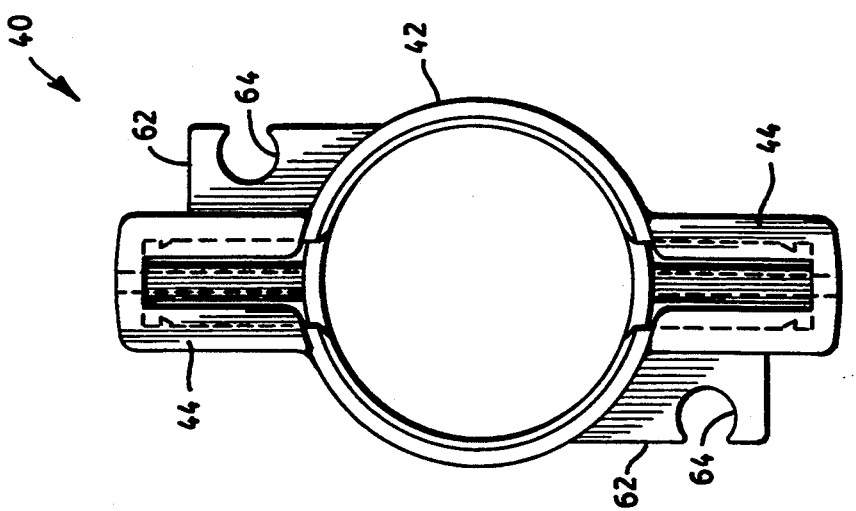
FIG. 3 is a front elevational view of an illustrative brush card.
Figure 6:
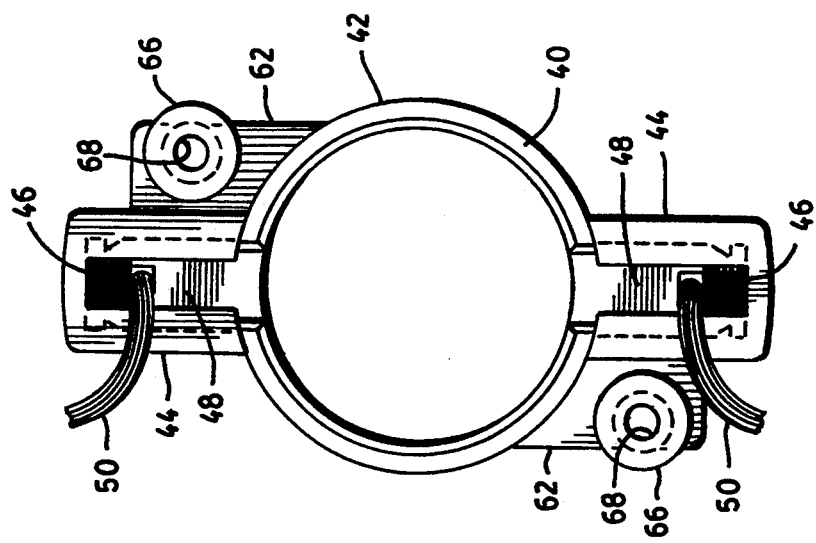
FIG. 6 is similar to FIG. 3, but shows the brush card with grommets, brushes and brush springs in place.
Figure 5:
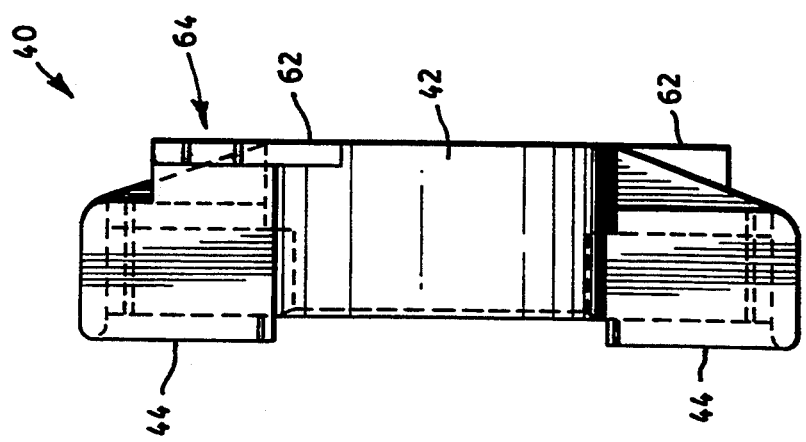
FIG. 5 is a side elevational view of the brush card of FIGS. 3 and 4.

Disposed in the endframe 30 is a discrete brush card 40 (FIGS. 1 and 2) which comprises a cylindrically-shaped central portion 42 (FIG. 2) configured to retain the commutator 16. Extending radially from the central portion 42 are opposed brush tubes 44 (FIGS. 2-5). The central portion 42 and the brush tubes 44 are of plastic and may be formed integrally. Each of the brush tubes 44 has disposed therein a coil spring 46 and a brush 48, the spring 46 biasing the brush 48 into engagement with the commutator 16 in the brush card central portion 42 (FIG. 1). Each brush 48 has attached thereto a conductive wire lead, or shunt 50, the other end of which is connected to a terminal 52 fixed in a terminal housing portion (FIG. 2).

Referring again to FIG. 1, it will be seen that the endframe 30 extends axially of the motor a sufficient distance to provide a plastic shell housing 56, comprising a side wall portion 58 of the endframe 30, around the commutator 16. The side wall portion 58 of the endframe 30 extends towards the armature 14 such that the commutator 16 is disposed fully within the plastic endframe 30 and is axially spaced from an open end 60 of the endframe 30 and from the metal shell 20. Thus, the noise-absorbing plastic shell housing 56 extends well beyond either end of the commutator to absorb radiated noise generated by the commutator-brush interface.

As may be seen in FIGS. 3-6 and 9, the brush card 40 is provided with flat tabs 62 having orifices 64 therethrough. Elastomeric grommets 66 (FIGS. 6 and 9) are mounted on the tabs 62 and in and around the orifices 64, the grommets 66 having openings 68 therein which are aligned, respectively, with the orifices 64.

Figure 7:
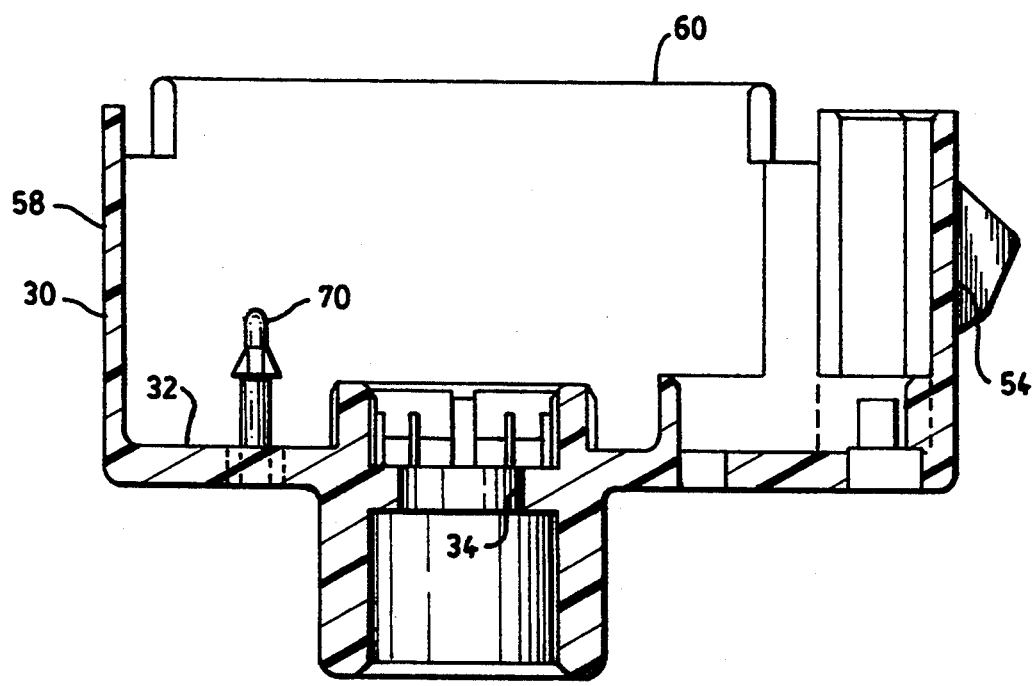
FIG. 7 is a sectional view of the endframe of FIGS. 1 and 2, showing one of the posts extending from the endframe closed end.
Figure 8:
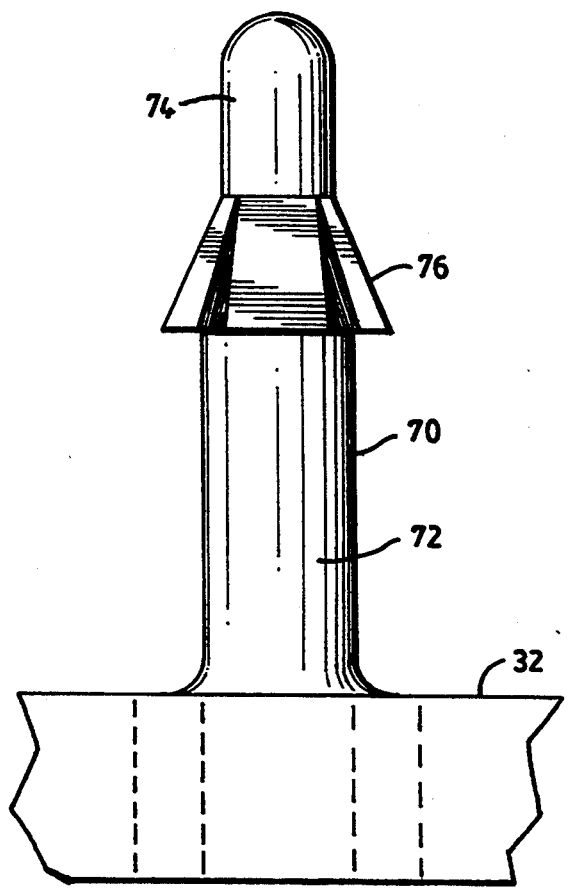
FIG. 8 is an enlarged elevational view of the post of FIG. 7.
Figure 9:
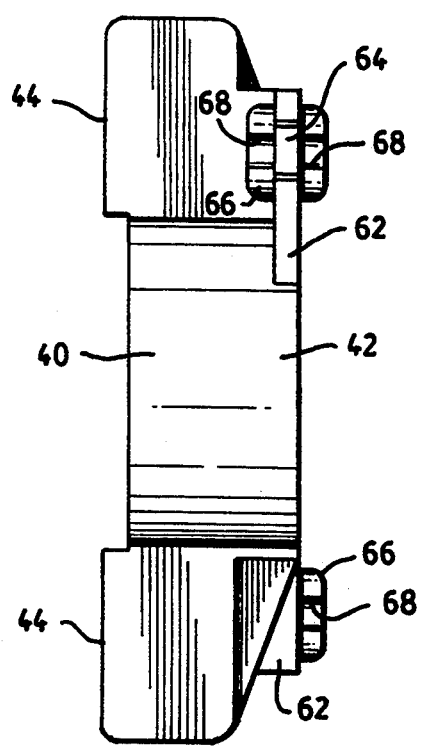
FIG. 9 is similar to FIG. 5, but shows the grommets in place on the brush card.

In FIG. 7, there is shown, in a sectional view of the endframe 30, a post 70 extending from the closed end 32 of the endframe. In FIG. 8, there is shown an enlarged elevational view of the post 70, which includes a barrel portion 72, a probe portion 74, and therebetween, a winged portion 76. The endframe preferably is provided with a plurality of such posts 70, as shown in FIG. 2.

Figure 10:
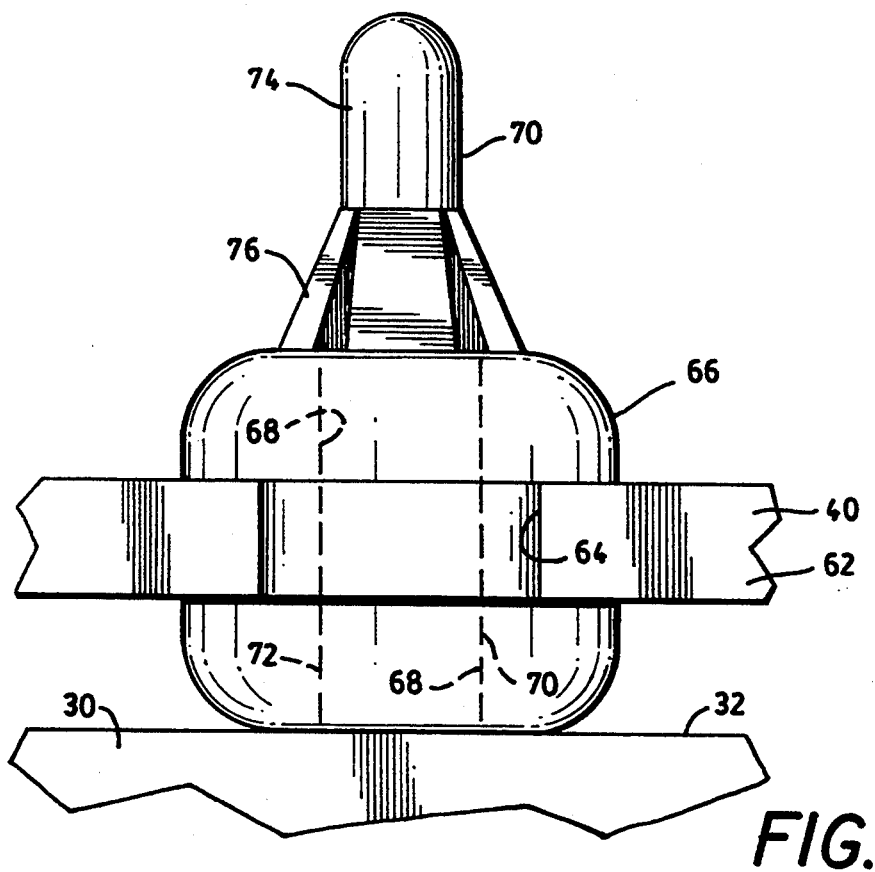
FIG. 10 is an enlarged elevational view of the brush card grommet and endframe post interlock.

In assembly of the endframe 30 and brush card 40, the grommets 66 of the brush card 40 are aligned with the posts 70 and pushed onto the posts. The probe portions 74 of the posts 70 pass through the grommet openings 68 and the brush card orifices 64 from one side thereof, followed by the winged portions 76 which emerge from the other side and overlie the other side of the grommets 66 (FIG. 10) to securely lock the brush card 40 to the endframe 30, but with the brush card separated from the end 32 of the endframe by the elastomeric grommets. As shown in FIG. 1, the outer ends of the brush tubes 44 are spaced from the endframe side wall portion 58. Thus, the noise generated at the interface of the brushes 48 and commutator 16 is not transmitted to the endframe, but, instead, is radiated from the commutator and, to a large degree, absorbed by the endframe side wall 58 and endframe end wall 32. There is thereby provided a motor which is quieter in operation and still easy and inexpensive to assemble.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. An electric motor comprising:
   a drive shaft,
   an armature and commutator assembly fixed on said drive shaft,
   a metal housing disposed around an armature portion of said assembly,
   permanent magnet means disposed between said armature portion and said housing,
   an endframe fixed to said housing, and
   a discrete brush card mounted in said endframe, said brush card having
      a cylindrical portion for retaining a commutator portion of said assembly, and
      brush tubes extending radially outwardly from said cylindrical portion, said brush tubes being adapted to retain brushes for engaging said commutator portion, and brush springs for urging said brushes into engagement with said commutator portion,
   said brush card having thereon tab portions with orifices therethrough and grommets mounted thereon, said grommets having openings extending therethrough and aligned, respectively, with said orifices,
   said endframe having posts extending from an end wall thereof,
   said grommet openings being configured to each receive one of said posts to lock said grommet onto said post, said grommets being at least in part disposed between said brush card and said endframe end wall to isolate said brush card from said endframe end wall.

2. The motor in accordance with claim 1 wherein said brush card is of a plastic material and said brush tubes are integral with said cylindrical portion.

3. The motor in accordance with claim 1 wherein said brush springs are coil springs.

4. The motor in accordance with claim 1 wherein said endframe is of a noise-absorbing plastic material and extends axially of the motor from said end wall of said endframe a distance such that said commutator portion is disposed fully within said endframe and spaced from said end wall and from an open end of said endframe.

5. The motor in accordance with claim 1 wherein each of said posts includes a winged portion adapted to overlie one of said grommets to lock said winged portion and grommet together, to lock said brush card onto said endframe.

6. The motor in accordance with claim 5 wherein each of said posts includes a barrel portion joined to said endframe end wall, a probe portion at a free end of said post, said probe portion being of less diameter than said barrel portion, and said winged portion therebetween.

7. The motor in accordance with claim 1 wherein said grommets are of elastomeric material.

8. The motor in accordance with claim 2 wherein outboard ends of said brush tubes are spaced from sidewalls of said endframe.

9. A brush card for connection to an endframe of an electric motor, said card comprising:
- a cylindrically-shaped central portion for retaining a commutator portion of said motor,
- brush tubes extending radially outwardly from said central portion,
- said brush tubes being configured each to retain a brush, and a brush spring for urging said brush into engagement with said commutator portion,
- said brush card having thereon tab portions with orifices therethrough, and grommets mounted on said tab portions, said grommets having openings therethrough aligned, respectively, with said orifices,
- at least a portion of each of said grommets being disposed on a surface of said tab portion adapted to be adjacent a wall of said endframe, whereby to isolate said brush card from said endframe wall upon said connection of said brush card to said endframe.

10. The brush card in accordance with claim 9, wherein said brush card is of a plastic material.

11. The brush card in accordance with claim 10, wherein said brush tubes are integral with said central portion.

12. The brush card in accordance with claim 9, wherein said grommets are of elastomeric material.

* * * * *